United States Patent
Shomler et al.

(10) Patent No.: US 6,971,829 B2
(45) Date of Patent: *Dec. 6, 2005

(54) FASTENING DEVICE

(75) Inventors: Duane C. Shomler, Cincinnati, OH (US); David L. Remerowski, Cincinnati, OH (US); Anthony T. Racca, Cincinnati, OH (US); David J. Lococo, Cincinnati, OH (US)

(73) Assignee: Senco Products, Inc, Cincinnati, OH (US)

( * ) Notice: Subject to any disclaimer, the term of this patent is extended or adjusted under 35 U.S.C. 154(b) by 393 days.

This patent is subject to a terminal disclaimer.

(21) Appl. No.: 10/405,832

(22) Filed: Apr. 2, 2003

(65) Prior Publication Data

US 2003/0170091 A1     Sep. 11, 2003

Related U.S. Application Data

(63) Continuation-in-part of application No. 09/376,172, filed on Aug. 17, 1999, now Pat. No. 6,543,976, which is a continuation-in-part of application No. 09/072,301, filed on May 4, 1998, now Pat. No. 5,938,386, which is a continuation-in-part of application No. 08/642,826, filed on May 3, 1996, now abandoned.

(51) Int. Cl.[7] .............................. F16B 13/00; E04B 1/48

(52) U.S. Cl. .................... 411/82; 411/258; 411/901; 411/909; 411/930; 156/91; 156/293; 428/344; 428/345; 428/349

(58) Field of Search ........................... 156/91, 275.7; 411/82, 82.2, 258, 901, 909, 930

(56) References Cited

U.S. PATENT DOCUMENTS

| | | |
|---|---|---|
| 3,391,846 A | 7/1968 | White |
| 3,574,031 A | 4/1971 | Heller et al. |
| 3,612,803 A | 10/1971 | Klass et al. |
| 3,816,203 A | 6/1974 | Bascom et al. |
| 3,941,643 A | 3/1976 | Balla |
| 3,996,402 A | 12/1976 | Sindt |
| 4,023,829 A | 5/1977 | Staats |
| 4,029,837 A | 6/1977 | Leatherman |
| 4,029,838 A | 6/1977 | Chamis et al. |
| 4,120,712 A | 10/1978 | Sindt |
| 4,123,305 A | 10/1978 | Krzeszowski |
| 4,355,222 A | 10/1982 | Geithman et al. |
| 4,420,352 A | 12/1983 | Schroeder et al. |
| 4,468,418 A | 8/1984 | Freeman |
| 4,521,659 A | 6/1985 | Buckley et al. |
| 4,657,717 A | 4/1987 | Cattanach et al. |

(Continued)

FOREIGN PATENT DOCUMENTS

DE       3805421       9/1989

(Continued)

OTHER PUBLICATIONS

Nordson Corporation Product Brochure 1998.

(Continued)

*Primary Examiner*—Sam Chuan Yao
(74) *Attorney, Agent, or Firm*—Edward K Welch, II

(57) ABSTRACT

A fastening device, which will facilitate the assembly of associated parts or manufactured articles, and electromagnetic energy absorptive component for absorbing electromagnetic waves and converting wave energy to heat; an expansive component, which expands upon exposure to heat emanating from the target material; matrix material, which will become adhesively active and effect the adherence of the associated parts upon exposure to heat emanating from the target material, and a stiffening component.

12 Claims, 8 Drawing Sheets

U.S. PATENT DOCUMENTS

| | | |
|---|---|---|
| 4,710,539 A | 12/1987 | Siadat et al. |
| 4,730,556 A | 3/1988 | Cobbs, Jr. |
| 4,749,833 A | 6/1988 | Novorsky et al. |
| 4,833,002 A | 5/1989 | Sinclair |
| 4,878,978 A | 11/1989 | Goel et al. |
| 4,900,390 A | 2/1990 | Colton et al. |
| 4,906,497 A | 3/1990 | Hellmann et al. |
| 4,910,048 A | 3/1990 | Sinclair |
| 5,004,111 A | 4/1991 | McCarthy |
| 5,043,741 A | 8/1991 | Spehrley, Jr. |
| 5,075,034 A | 12/1991 | Wanthal |
| 5,129,977 A | 7/1992 | Leatherman |
| 5,266,764 A | 11/1993 | Fox et al. |
| 5,277,737 A | 1/1994 | Li et al. |
| 5,313,034 A | 5/1994 | Grimm et al. |
| 5,326,605 A | 7/1994 | Ono et al. |
| 5,338,497 A | 8/1994 | Murray et al. |
| 5,340,649 A | 8/1994 | Roeker et al. |
| 5,391,595 A | 2/1995 | Clark, Jr. et al. |
| 5,447,592 A | 9/1995 | Berce et al. |
| 5,500,511 A | 3/1996 | Hansen et al. |
| 5,508,496 A | 4/1996 | Hansen et al. |
| 5,556,565 A | 9/1996 | Kirkwood et al. |
| 5,558,735 A | 9/1996 | Rettew et al. |
| 5,599,622 A | 2/1997 | Kinzer et al. |
| 5,645,744 A | 7/1997 | Matsen et al. |
| 5,705,796 A | 1/1998 | Hansen et al. |
| 5,717,191 A | 2/1998 | Christensen et al. |
| 5,723,849 A | 3/1998 | Matsen et al. |
| 5,728,309 A | 3/1998 | Matsen et al. |
| 5,751,303 A | 5/1998 | Erickson et al. |
| 5,756,973 A | 5/1998 | Kirkwood et al. |
| 5,770,296 A | 6/1998 | Remerowski et al. |
| 5,795,638 A | 8/1998 | Roder et al. |
| 5,808,281 A | 9/1998 | Matsen et al. |
| 5,827,913 A | 10/1998 | Baetzold et al. |
| 5,833,795 A | 11/1998 | Smith et al. |
| 5,843,057 A | 12/1998 | McCormack |
| 5,894,700 A | 4/1999 | Sweet |
| 5,916,469 A | 6/1999 | Scoles et al. |
| 5,919,387 A | 7/1999 | Buckley et al. |
| 5,935,475 A | 8/1999 | Scoles et al. |
| 5,935,698 A | 8/1999 | Pannell |

FOREIGN PATENT DOCUMENTS

| | | |
|---|---|---|
| DE | 3940461 | 6/1991 |
| EP | 0314548 | 7/1988 |
| EP | 0440410 | 8/1991 |
| GB | 2065027 | 6/1981 |
| GB | 2240980 | 8/1991 |
| JP | 04364926 A | 12/1992 |
| JP | 05138742 A | 6/1993 |
| JP | 6116029 | 4/1994 |
| WO | WO 8700074 | 1/1987 |

OTHER PUBLICATIONS

Bostik, Inc. Product Borchure on Automotive & Industrial Adhesives 1998.

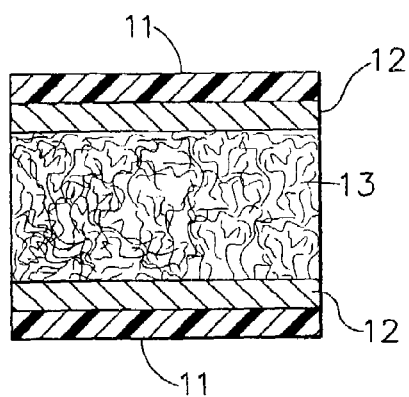
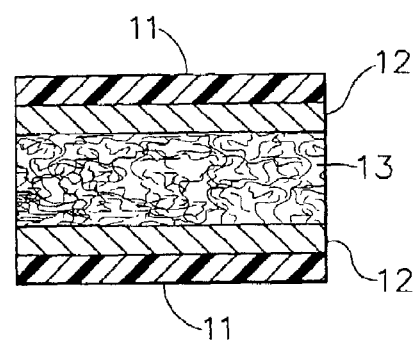
FIG. 5
FIG. 6
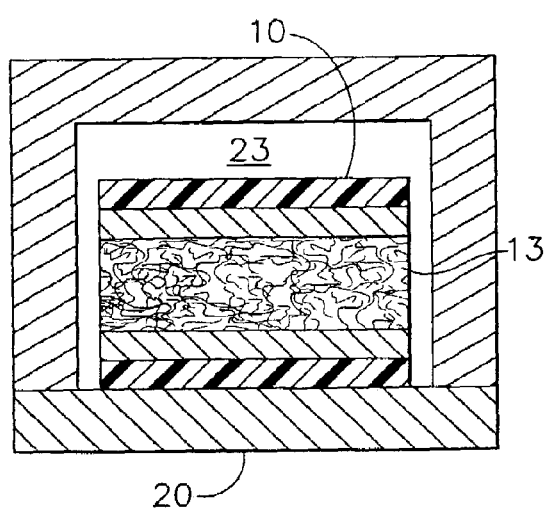
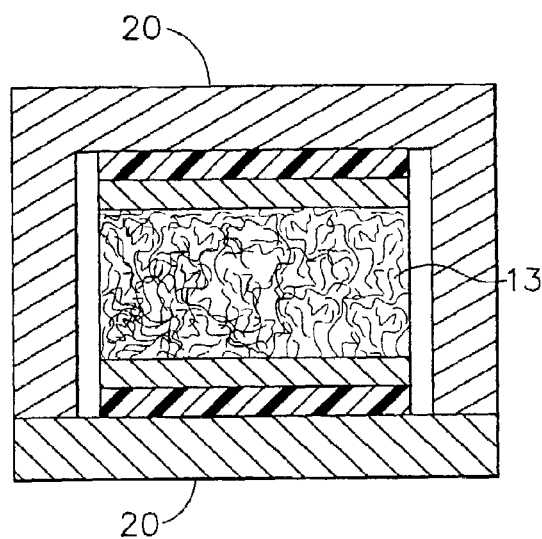
FIG. 7
FIG. 8

FASTENING DEVICE

CROSS REFERENCE TO A RELATED APPLICATION

This application is a continuation-in-part application of U.S. patent application Ser. No. 09/376,172, filed on Aug. 17, 1999 now U.S. Pat. No. 6,543,976, which is a continuation-in-part of U.S. patent application Ser. No. 09/072,301, filed on May 4, 1998, now U.S. Pat. No. 5,938,386, which is a continuation-in-part of U.S. patent application Ser. No. 08/642,826 filed on May 3, 1996, now abandoned.

TECHNICAL FIELD

The disclosed invention relates to a fastening device which is useful in facilitating the assembly of associated parts by employing a heat activated assembly element such as a dowel or a disc or a strip constructed to include a target material and a solid substance which will exhibit adhesive and expansive properties on exposure to heat. The heat will be generated in the target material by exposing the target material to electromagnetic waves.

BACKGROUND OF THE INVENTION

U.S. Pat. No. 4,038,120 to Russell describes the use of an energized heating element or wire to heat a hot melt glue resulting in adhesion between contiguously assembled panels. The reference method involves heating a glue-coated wire to liquefy the glue, producing a cohesive state and facilitating the assembly of panels. This method is useful for introducing a cohesive material (glue) to an area of limited accessibility (groove), but the heating element (wire) requires the direct application of energy (electricity) to provide the heat to melt the glue.

U.S. Pat. No. 3,996,402 to Sindt relates to the assembly of sheet materials by the use of a fastening device utilizing an apertured sheet of eddy current-conducting material sandwiched between coatings of hot-melt glue. An induction heating system is activated causing eddy current heating in the EC-conducting material with consequent melting of the hot-melt glue thus resulting in fusion and bonding of the sheet materials in accordance with the desired construction.

U.S. Pat. No. 3,574,031 to Heller et al. describes a method and material for welding thermoplastic bodies by using a susceptor sealant between the bodies to be joined. The susceptor sealant is characterized by having particles, heatable by induction, dielectric or radiant energy, dispersed in a thermoplastic carrier compatible with the thermoplastic sheets to be welded. The welding of the thermoplastic sheets is effected by applying and exposing the susceptor sealant to heat energy, softening the carrier material and joining all thermoplastic materials.

U.S. Pat. No. 3,612,803 to Klaas discloses a fastening device, which, in its most relevant embodiment, consists of a quantity of heat-activatable adhesive containing a closed electronically conductive loop and a ferromagnetic material insulated from said closed loop. In operation, the fastening device is activated by a solenoid coil energized with alternating electrical current. The current emitted from the solenoid is transferred to the fastening device where a current of large amperage and low voltage is generated in the loop enveloped by the heat-activatable adhesive. The current produces heat that causes the adhesive to become sticky. The efficiency, and apparently the usefulness, of the disclosed device is improved by fitting it with a ferromagnetic core enclosed within the closed loop.

SUMMARY OF THE INVENTION

The instantly disclosed fastening device is distinguished from, and goes beyond, the prior art by describing an assembly element which will provide structure, strength and stability to an assembled product while serving as a vehicle for introducing an adhesive material in a neat, non-messy form to internal and inaccessible areas of the parts to be assembled. In addition to providing adhesive properties, the disclosed device simultaneously expands upon exposure to heat; this expansion takes up assembly clearances and provides contact pressure at the interface between the adherends and the device. The disclosed device includes a target material for absorbing and converting electromagnetic waves to heat, and for conducting heat energy to both the expansive assembly element and the adhesive material so that it can be activated to provide an adhesive bond between the associated parts. This disclosure also relates to an improved and expeditious method for the assembly and adherence of associated parts of various materials which are mostly transparent to electromagnetic waves. The improved method utilizes a device which comprises an assembly element which includes a receptive target material for absorbing electromagnetic waves, a solid adhesive material contiguous with the conductive target material which will become physically or chemically adhesive by heat energy resulting from electromagnetic waves absorbed and conducted by the target material, and an expansive material which expands concurrently with the heat from the target material. This disclosure also relates to the assembled products produced according to the method utilizing the disclosed fastening device.

BRIEF DESCRIPTION OF THE DRAWINGS

The accompanying drawings incorporated in and forming a part of the specification, illustrate several aspects of the present invention, and together with the description serve to explain the principles of the invention. In the drawings:

FIG. 5 is a sectional view of the fastening device which illustrates the orientation of fibrous material in the condition prior to application of heat and pressure;

FIG. 6 is a sectional view of the fastening device which illustrates the orientation of fibrous material after application of heat and pressure and subsequent cooling;

FIG. 7 is a sectional view of the fastening device of FIG. 6 assembled within an article before activation by electromagnetic waves;

FIG. 8 is a sectional view of the fastening device assembled within an article after activation by electromagnetic waves;

FIG. 19b is a sectional view of the fastening device in the shape of a disk taken along section line of FIG. 19a.

DETAILED DESCRIPTION OF THE PREFERRED EMBODIMENTS

Reference will now be made in detail to the present preferred embodiments of the invention, examples of which are illustrated in the accompanying drawings, wherein like numerals indicate the same elements throughout the views.

Figure 1:
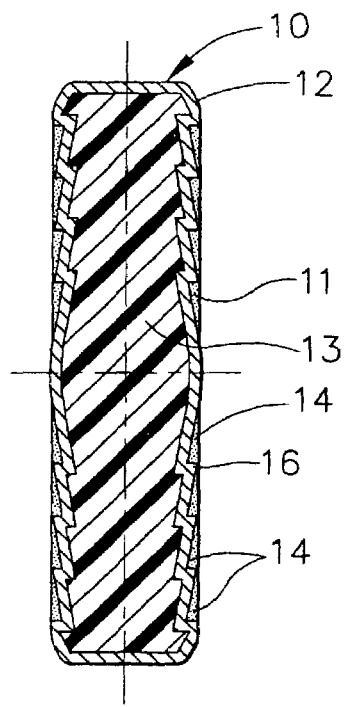
FIG. 1 is a sectional view of the fastening device fashioned into the shape of a dowel.
Figure 2:
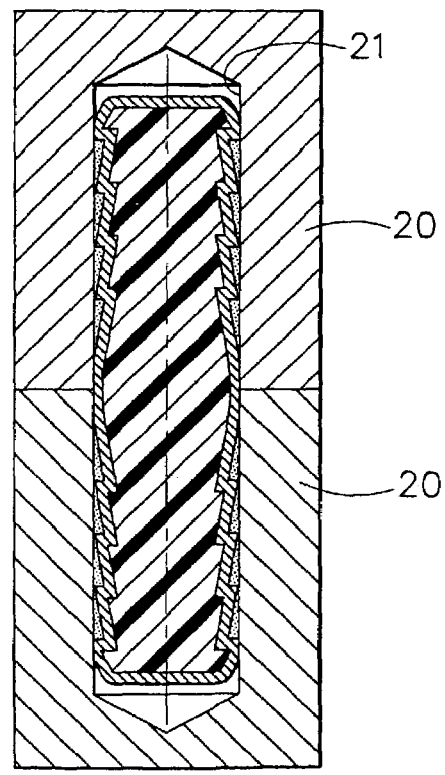
FIG. 2 is a sectional view of the fastening device in the form of a dowel situated and "hidden" within associated parts.
Figure 3:
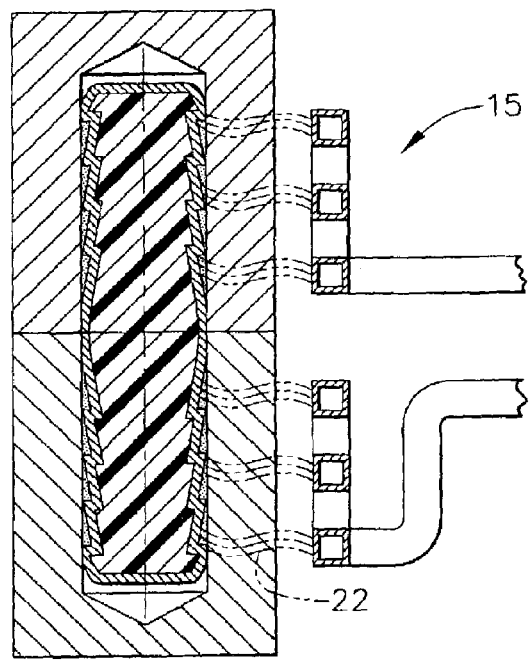
FIG. 3 is a sectional view of the fastening device situated as in FIG. 2 and being adhesively activated by electromagnetic waves emanating from an RF source.

The disclosed device 10, shown in FIG. 1, features an expansive assembly element 13, a target material 12, and coated with a solid adhesive material 11. As illustrated in FIG. 2, device 10 is designed to be placed, in a generally hidden relationship, between or within associated parts 20 to be adhesively joined. When desirably situated, such as in holes 21 drilled to accommodate a dowel or in grooves cut to accommodate a disc, the device can be exposed to electromagnetic waves 22, generally emanating from a generator 15 by passing the wand of the generator in the general area of the "hidden" device, as shown in FIG. 3. The preferred range for electromagnetic wave frequency is from approximately 100 Hertz (100 Hz) to approximately 10 Megahertz (10 MHz). The electromagnetic waves will penetrate the aligned associated parts 20, to be adhesively joined, said parts being substantially transparent to electromagnetic waves. The target material must be fashioned from substances which are not transparent to electromagnetic waves, that will absorb the electromagnetic waves, and create heat which will be conducted to both the solid adhesive material and the expansive assembly element. To elaborate, heat is produced in the conductive target material by two mechanisms: eddy current resistive heating and magnetic hysteresis. Eddy current resistive heating applies to all conductive materials and is produced in the target material by the electromagnetic waves emanating from the generator (sometimes called the induction coil). The generator is energized by a traditional source of alternating current. The heat from magnetic hysteresis is observed only in magnetic materials. As the electromagnetic field produced by the generator reverses polarity, the magnetic sites in the target material also reverse. There is an energy loss in this reversal which is analogous to friction; this energy loss is magnetic hysteresis. The "lost" energy is immediately converted to heat and conducted by the target material to both the heatactivatable adhesive material to initiate adhesion and to the expansive assembly element to initiate expansion. When heated to the necessary temperature, the adhesive material will soften, liquefy or become heat-activated, attach itself to the adjacent associated parts, and, on cooling, create an adhesive relationship between the associated parts.

Two types of adhesives, hot-melt and heat-activated cure, are proposed for use with the disclosed device. Both types of adhesives are initiated by heat emanating from the conductive target material. Hot-melt adhesives are solid at ambient temperatures, but melt or liquefy when the temperature is elevated by heat flowing from the conductive target material. The melted adhesive wets the adherends and, in the case of porous, foraminous, or fibrous adherends, penetrates the surface of the parts to be bonded. As the adhesive cools, the adherends and adhesive are bonded. In the case of porous, foraminous, or fibrous adherends, mechanical interlocking can contribute to bond strength. Note that for the hot-melt mechanism, the bonding is reversible. Thus, by repeating the induction heating procedure, the bond can be undone and the adherends separated. The ability to reverse the adhesion and separate assembled parts is not a trivial attribute. In addition to the advantage of being able to re-assemble or repair misaligned parts, it is also desirable to be able to disassemble manufactured articles to facilitate serviceability and repair. Often, when working with associated parts of different materials, it will be beneficial to disassociate assembled parts to facilitate recycling. Heat-activated curing adhesives are also solid and easy to manipulate at ambient temperatures, but when the adhesive temperature is elevated by the heat from the conductive target material, a chemical reaction is initiated. This reaction involves a cure or crosslinked bonding either within the adhesive or between the adhesive and the adherends. Such bonds are typically irreversible. Frequently, a heat activated curing adhesive bond will demonstrate an electrostatic attraction between the adhesive and the adherends and a crosslinked bond within itself. In one form of a typical embodiment of the disclosed fastening device 10, the adhesive coated target material can comprise or be affixed to, or incorporated into, an expansive assembly element 13, such as a dowel, a strip, or a disc. In one preferred embodiment as shown in FIG. 1, the assembly device is formed, molded, compressed or machined into a dowel having an annular dam 14 or fitted diameter for containing or localizing the adhesive after it has liquefied and positioning barbs 16 to help the dowel remain in the desired alignment. The dowel is then wrapped, coated, surrounded, embedded or integrated with an RF target material 12 fashioned from a readily available RF susceptor such as steel or aluminum. Electromagnetic energy absorptive component 12 may also be disposed within the expansive components on the surface of the expansive components, within stiffening components, on the surface of the stiffening components, or within the adhesive material. The solid adhesive material is attached to the foil by a liquid coating or physical self-attachment in the form of a film, encapsulants, granules or powder. The fully fabricated device is then inserted in pre-drilled holes 21, aligned between associated parts 20 to be joined and the joined parts are then exposed to electromagnetic waves 22 from an electromagnetic wave generator 15 as shown in FIG. 3. The waves must penetrate the parts to be joined but all materials, to some extent, are transparent to electromagnetic waves. Materials that are not as transparent, such as those containing significant amounts of metal, will simply require a longer or more intensive exposure to the electromagnetic wave generator and the emanating waves. Then, the target material absorbs the emanating waves, converts the waves to heat energy, and conducts the heat energy to both the adhesive coating and the expansive assembly element.

The expansive assembly element 13 is to be fabricated from a variety of materials that exhibit suitable compressibility and mixed with a heat activated binder material. Suitable compressible materials will be either fibrous, foraminous, or rubber-like in nature and have suitable temperature resistance to allow activation of the binder material. Suitable fibrous materials include fiberglass, ceramic fibers, graphite fibers, metal wool, plant fibers, animal bristles, and mixtures of the preceding. Suitable foraminous materials include sponges, crushed nutshells, hollow plastic spheres, and synthetic foam products. Binder materials will be either hot melt adhesives or heat curing adhesives.

Alternatively, the expansive component may be derived from the product of a heat activated or enabled chemical reaction, and not necessarily be pre-compressed. Either reaction products from the combination of two or more materials or decomposition products from one or more components may produce a product with a significant or required increase in specific volume. Such ingredients may or may not be encapsulated. The most dramatic reaction products will become gases at least at an elevated temperature during thermal activation. Upon cooling, an element of the expansion will remain. Examples include voids in the case of gases and regions of material with overall lower densities, i.e., increased specific average volumes.

Alternatively, the expansive component may be derived from a purely physical phase change. One or more components may become gaseous at least at an elevated temperature during thermal activation. Upon cooling or vitrification from chemical reaction, voids may remain as a result of gaseous expansion. A further example would include encapsulated materials under pressure whose shells collapse or melt as temperature increases, allowing a gas to expand or a solid or liquid to phase change to a gas and to expand.

As shown in FIGS. 13–19b, one or more stiffening components 15 may be provided to the fastening device of the present invention to provide additional rigidity and strength to the assembly. Preferably, the stiffening component 15 is of a strength and rigidity at least as great as that of the other components of the fastening device. The stiffening component materials preferably include wood or cellulose fibers, carbon, glass, boron, or other high modulus fibers, engineering thermoplastics, ceramic material, combinations of the aforementioned materials and any other material of suitable stiffness and durability that does not interfere with the expansion process or RF energy absorption. Alternatively, the stiffening component may act as a susceptor itself. The stiffening components may be of any suitable configuration to impart desirable stiffness to the fastening components. For example, the stiffening component may cover a portion or all of the fastening component. The stiffening component may be of a single, unitary piece or multiple stiffening components may be provided in a fastening device. The stiffening components may be of a honeycomb or web-like material. Stiffening components may also be expansive to provide for additional tightness of fit of the fastening device within the associated pieces. Additionally, the stiffening components may contain adhesives or matrix materials that advantageously react with heat as well.

Figures 4, 4A:
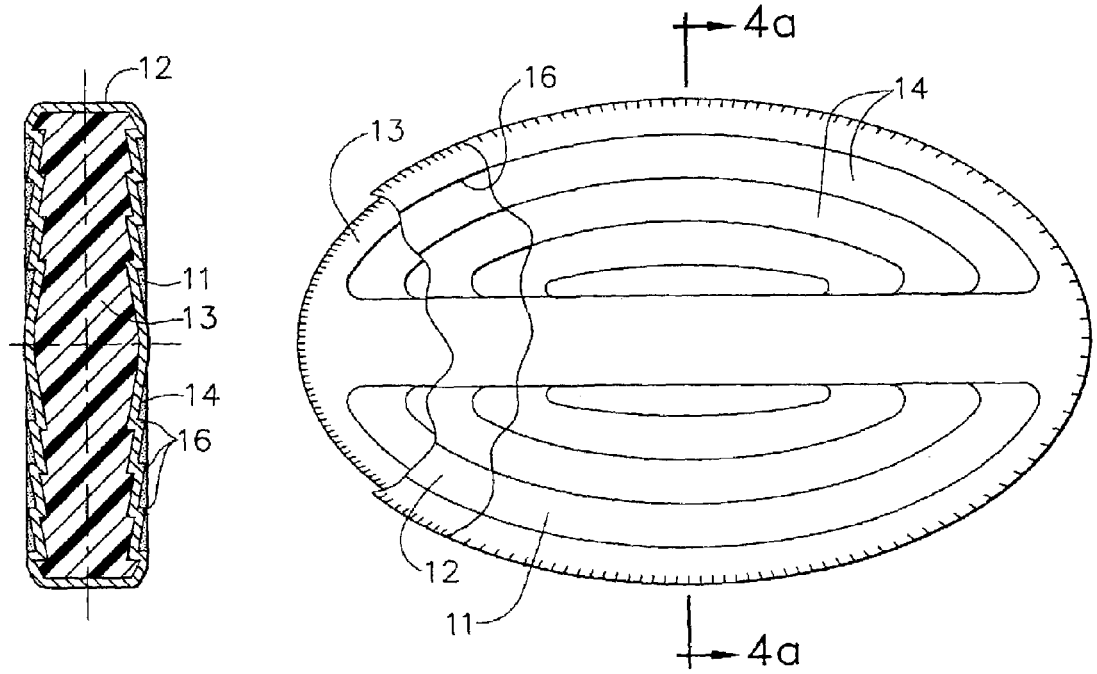
FIG. 4 is a partial sectional plan view of the fastening device in the shape of a disc depicting repositories of adhesive material.
FIG. 4a is a sectional view of the fastening device in the shape of a disk, taken along section line 4a:4a of FIG. 4.
Figure 13:
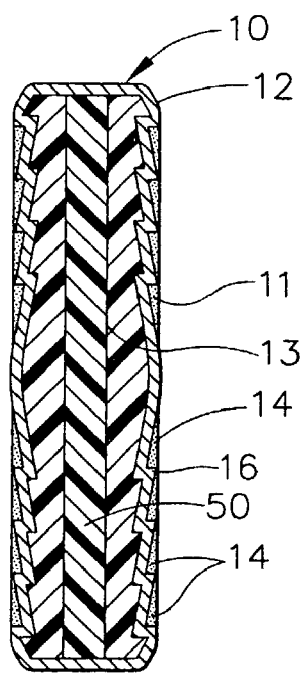
FIG. 13 is a sectional view of the fastening device fashioned into the shape of a dowel and including a stiffening component.
Figure 14:
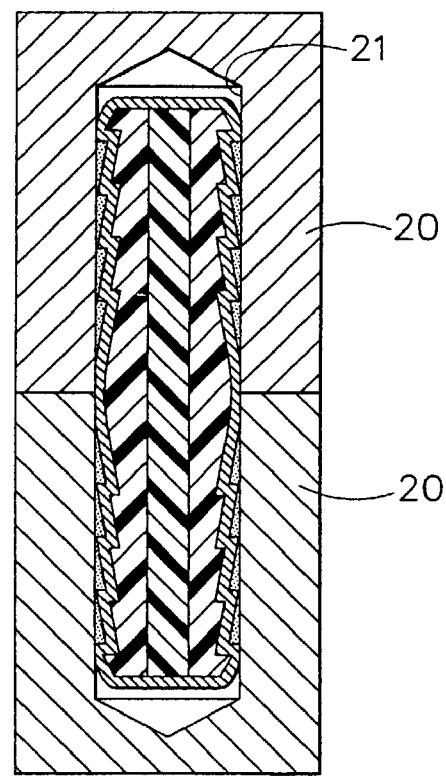
FIG. 14 is a sectional view of the fastening device in FIG. 13 situated and "hidden" within associated pieces.
Figure 15:
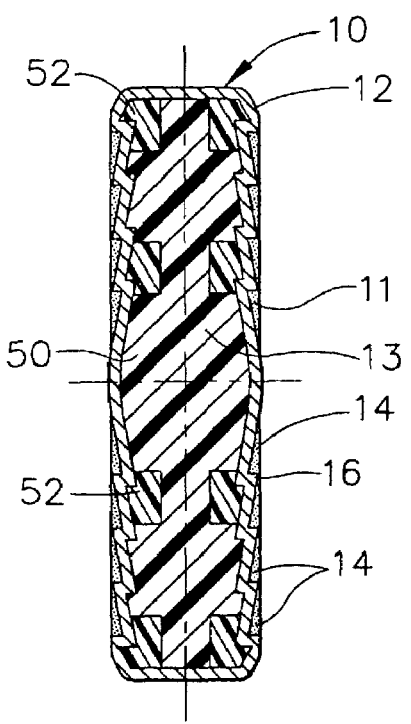
FIG. 15 is a sectional view of the fastening device fashioned to the shape of a dowel and including rings 52 of expansive component.
Figure 16:
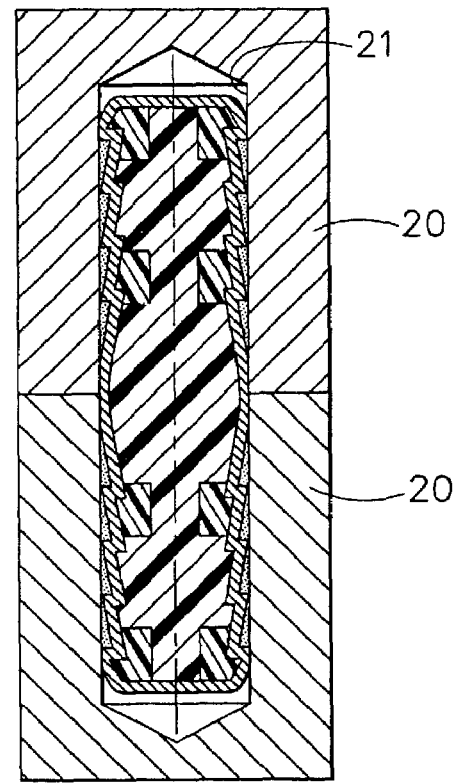
FIG. 16 is a sectional view of the fastening device of FIG. 15.
Figure 17:
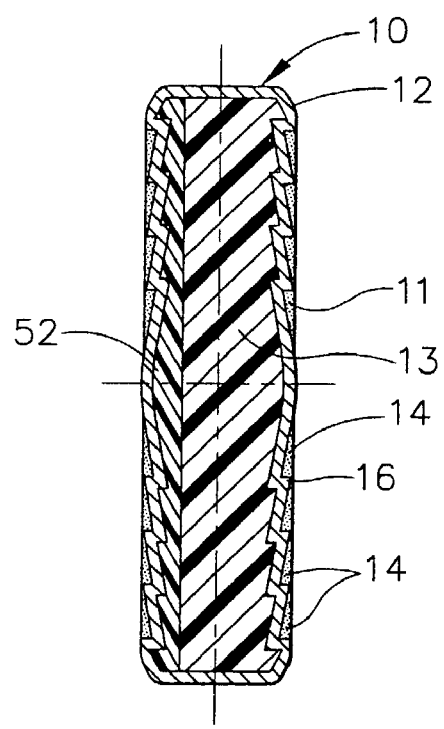
FIG. 17 is a sectional view of the fastening device fastened to the shape of a dowel and including a strip of expansive component.
Figure 18:
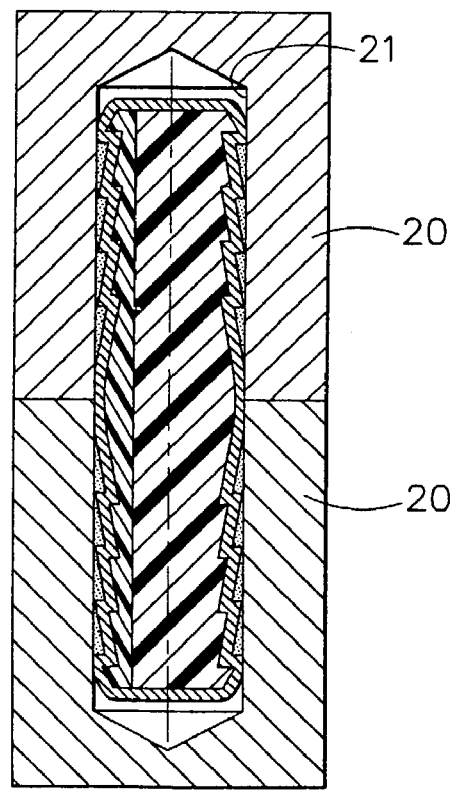
FIG. 18 is a sectional view of the fastening device of FIG. 17 situated in and hidden within associated pieces.
Figure 19B:
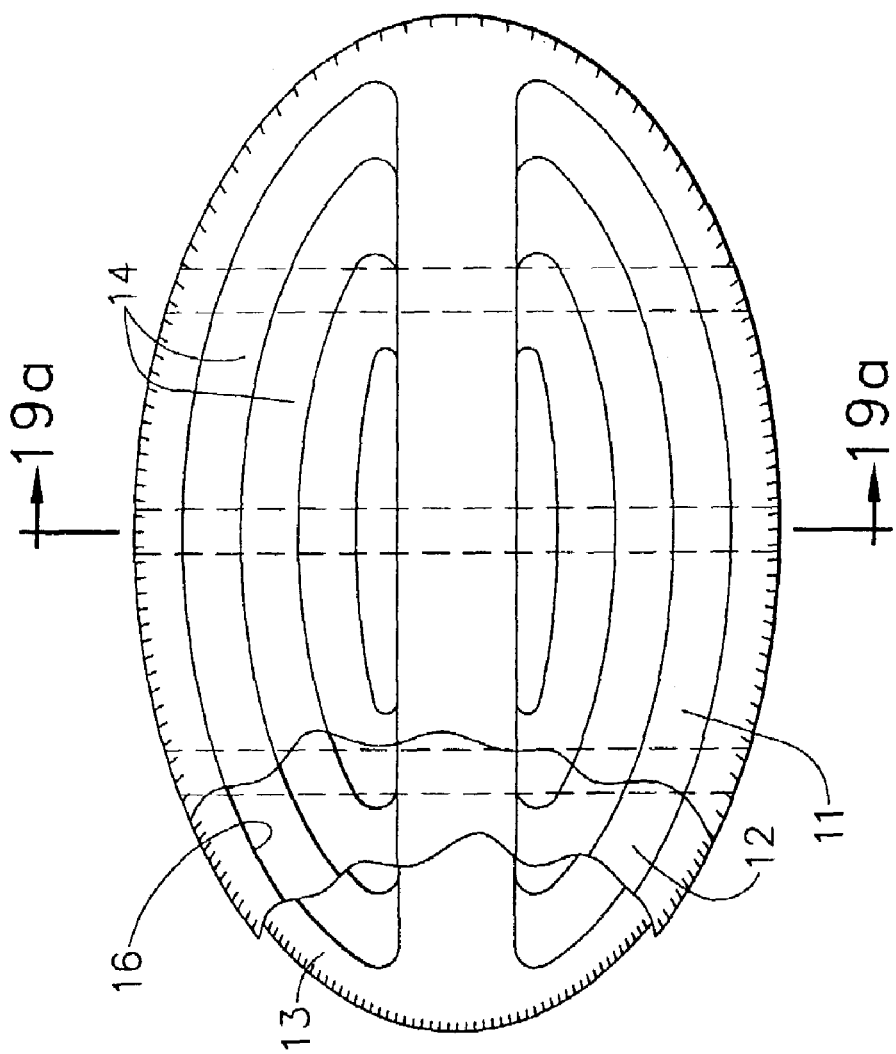
Figure 19A:
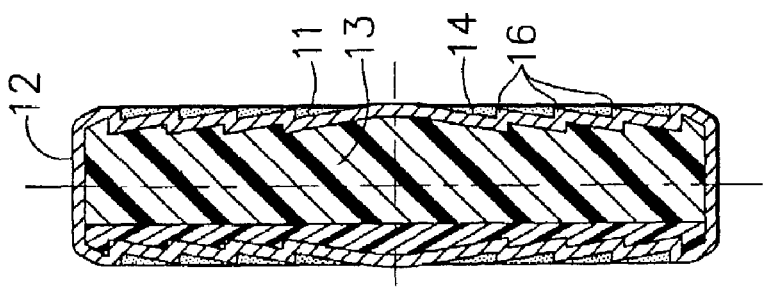
FIG. 19a is a partial sectional plan view of the fastening device in the shape of a disk depicting depositories of adhesive material and strips of adhesive components.

FIGS. 13 and 14 depict alternative embodiments of the fastening device comprising a substantially longitudinally disposed stiffening component 50 disposed within the expansive component 13. FIGS. 15 and 16 show an additional alternative embodiment wherein rings of expansive material 52 are disposed in annular depressions of stiffening component 50. FIGS. 17 and 18 depict stiffening components 50 containing a depression that receives a strip of adhesive material 52. Although only one such adhesive strip 52 is shown in FIG. 17 and 18, any number of strips may be provided to the fastening device 10 in order to impart the appropriate amount of adhesive and tight fit within the associated pieces 20. Strips of adhesive material 52 may be substantially linear or may be disjointed and/or curvilinear. As shown in FIGS. 4 and 4A, the assembly device may comprise a device in the shape of a disk, including repositories or channels for directing adhesive material. Additionally, as shown in FIGS. 19a and 19b, the disk may be comprised substantially of stiffening components 50 and may include one or more strips of adhesive components 52.

The operation of the fastening device is illustrated in FIG. 5 through FIG. 8. Note that for presentation purposes, the expansive assembly element 13 is shown to be a fibrous material, although the operation of the device would be the same for other materials. In FIG. 5, the fastening device 10 is shown before compression of the expansive assembly element 13. The fastening device 10 after compression of the expansive assembly element 13 is shown in FIG. 6. The compression is achieved by applying heat and pressure to the expansive element 13 until the adhesive binder material within element 13 is activated then cooling sufficient to harden the binder material in order to fix the element in the compressed state. The fastening device 10 is placed within associated parts 20 to be adhesively joined in FIG. 7. Note that in order to assure that the mating line 24 of the assembly is minimized, a clearance 23 is provided. Upon exposure to electromagnetic waves, the target element 12, which is an RF susceptor material such as steel, absorbs same and converts the energy to heat which is conducted to both the adhesive 11 and the expansive assembly element 13. Concurrently, the adhesive is activated and the element expands. The expansion of the fastening device takes up the assembly clearance 23 and transports the adhesive to the adherent surface. The resultant pressure from the expansion of the device is beneficial both in the adhesive bonding and in increasing the bond strength by friction.

Figure 9:
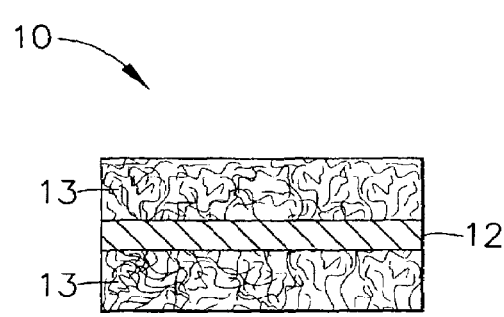
FIG. 9 is an alternative embodiment of the fastening device.
Figure 10:
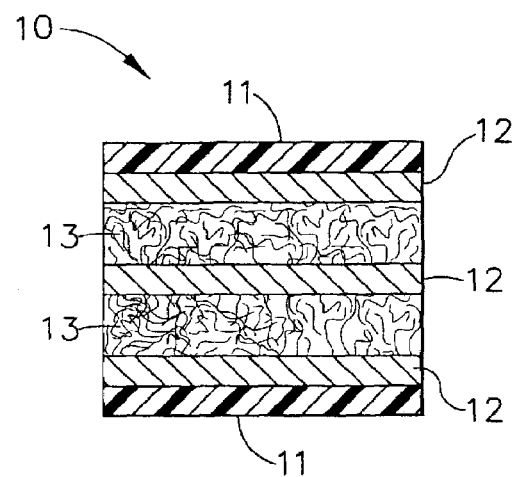
FIG. 10 is an alternative embodiment of the fastening device.
Figure 11:
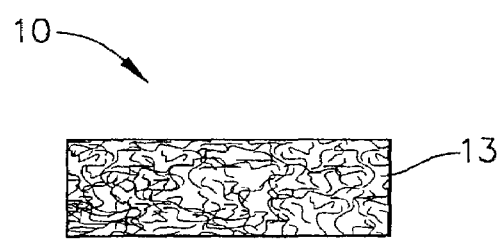
FIG. 11 is an alternative embodiment of the fastening device.
Figure 12:
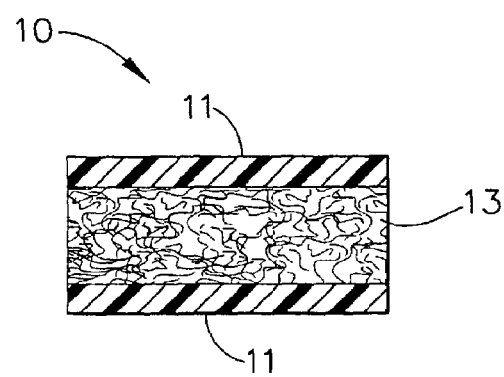
FIG. 12 is an alternative embodiment of the fastening device.

Alternative embodiments of the fastening device are illustrated in FIG. 9, FIG. 10, FIG. 11, and FIG. 12. In FIG.9, the fastening device 10 consists of a target material 12 surrounded by an expansive assembly element 13 on both sides. In FIG. 10, the fastening device 10 is shown with three target material layers 12 which could reduce the time needed to heat the adjacent expansive assembly elements 13 sandwiched between them. In certain applications, this configuration could be extended to an indefinite number of target material layers. An expansive assembly element which incorporates the target element function is shown in FIG. 11. Here, the target material 13 would be either metallic fibers, particles, or flakes. Alternative target materials would include conductive (metallic or organic) materials, inherently conductive particles (ICP's), and semiconductive materials such as graphite and silicon, in the form of fibers, flakes or particles. The fastening device 13 could also be mixture of suitable compressible materials with suitable target materials and an adhesive binder material. In FIG. 12, the fastening device 10 consists of two adhesive layers 11 sandwiching a composite expansive assembly element 13 of FIG. 11.

In laboratory experiments with an assembly device as disclosed here, a fiberglass mat originally 0.188 inches thick was heated in an oven with a film of a polyamide hot melt adhesive on top. The oven temperature was set at 450° F., which is slightly above the melting point. Upon melting the adhesive was absorbed into the fiberglass. The hot adhesive wetted mat was removed from the oven, sandwiched between two sheets of aluminum foil and placed in a press. Pressure was applied until the adhesive was observed to be solidified. Thickness was measured to be 0.100 inches. The lamination was then heated using electromagnetic waves with a frequency of approximately 100,000 hertz (100 kHz) until expansion of the lamination was observed. The lamination continued to expand after removal of the heating source. Upon cooling the lamination thickness was measured at 0.147 inches.

Immediate needs for the disclosed fastening device have been identified in the furniture industry where neat, effective and efficient assembly methods can readily be exploited to manufacture affordable units in a fast, effective and clean manner. Furniture and cabinet manufacturing applications will involve the assembly of associated parts of wood and plastic, both of which are transparent to electromagnetic waves and receptive to adhesive bonding. Other uses for the disclosed device include the fabrication of lattice panels, the installation of trim molding and fence erection. Also envisioned is the assembly of plywood, gypsum board and combination boards to wall ceiling and floor framing materials. In the packaging industry, there is a need to facilitate the fast and effective construction of containers made of wood, plastic, and engineered fiber base materials, which could all be readily assembled using the disclosed device. In addition to the simplest configuration of the fastening device where the assembly element is a disc, dowel or strip coated with an adhesive material, other configurations of the fastening device are also envisioned. One such configuration features a fastening device comprising an expansive assembly element providing alignment and support to assembled associated parts, a conductive target material integrated with the expansive assembly element, for absorbing electromagnetic waves and an adhesive material, contiguous with the RF susceptor material, becoming adhesively active by heat energy resulting from the electromagnetic waves absorbed and conducted by the target material.

While the foregoing is a complete description of the disclosed method, numerous variations and modifications may also be employed to implement the purpose of the invention. And, therefore, the elaboration provided should not be assumed to limit the scope of the invention that is intended to be defined by the appended claims.

What is claimed is:

1. A fastening device for promoting the assembly and adherence of associated pieces by exposure to electromagnetic energy, said fastening device having an outer surface and comprising:
    (i) an electromagnetic energy absorptive component comprising an electromagnetic energy absorptive target material;
    (ii) an expansion component adapted to be expansive in at least one direction upon exposure to heat, said expansion component being in a compressed state which compressed state is released upon exposure to heat; and
    (iii) a matrix material component comprising a matrix material, said matrix material being adhesively activatable by heat energy;
wherein the matrix material comprises or is disposed on the outer surface of the fastening device and the matrix material, the expansion component and the electromagnetic energy absorptive component are oriented so that heat generated in the electromagnetic energy absorptive component is conducted to the matrix material and expansion component whereby when said fastening device is positioned within said associated pieces and is exposed to electromagnetic energy, said electromagnetic energy absorptive component provndes heat energy to activate said expansion component and said matrix material, thereby causing said matrix material to either soften or liquefy as well as become adhesively active and allowing or causing the expansion component to expand in at least one direction causing contact of said matrix material and said associated pieces, thereby effecting ajoining or bonding relationship upon cooling of said matrix component.

2. The fastening device of claim 1 wherein the expansion component is held in a state of compression by a reversible heat activated binder material.

3. The fastening device of claim 2 wherein the heat activated binder material is a hot melt adhesive.

4. The fastening device of claim 2 wherein the heat activated binder material is activated at temperatures the same as or lower than the activation temperature of the matrix material.

5. The fastening device of claim 1 wherein the expansion component is selected from the group consisting of fibrous, foraminous and rubber-like materials.

6. The device of claim 3, wherein the expansion component is a fibrous material selected from a group consisting of fiberglass, ceramic fibers, graphite fibers, metal wools, plant fibers, animal fibers, polymer fibers and mixtures thereof.

7. The device of claim 3, wherein the expansion component is a foraminous material selected from a group consisting of sponges, crushed nut shells, hollow plastic spheres, ground cork, synthetic foam, and mixtures thereof.

8. The device of claim 1, wherein said eleciromagnetic energy absorptive component is selected from the group consisting of a metallic foil, a metallic fibrous material, conductive metal particles, metallic flakes, conductive organic material, conductive magnetic material, inherently conductive particles, and mixtures thereof.

9. The fastening device of claim 1, wherein said electromagnetic energy absorptive component is disposed in at least one of the following ways; on an outer surface of said expansion component, within said expansion component, on an outer surface of said matrix material component, and within said matrix material component.

10. The device of claim 1, wherein said matrix material is a hot melt adhesive.

11. The device of claim 1, wherein said matrix material is a heat activatable adhesive.

12. A fastening device for promoting the assembly and adherence of associated pieces by exposure to electromagnetic energy, said fastening device having an outer surface and comprising:
    (i) an electromagnetic energy absorptive component which generates heat as a result of the eddy current resistive heating upon exposure to electromagnetic energy;
    (ii) an expansion component adapted to be expansive upon exposure to heat in at least one direction, said expansion component being selected from the group consisting of compressed fibers, compressed foraminous materials and compressed rubber-like materials, which materials release from their compressed state upon exposure to heat; and (iii) a matrix material component selected from the group consisting of hot melt adhesives and heat activated adhesives;

wherein the matrix material comprises or is disposed on the outer surffice of the fastaing device and the matrix material, the expansion component and the electromagnetic energy absorptive component are oriented so that heat generated in the electromagnetic energy absorptive component is conducted to the matrix material and expansion component whereby when said fastening device is positioned within said associated pieces and is exposed to electromagnetic energy, said electromagnetic energy absorptive component provides heat energy to activate said expansion component and said matrix material, thereby causing said matrix material to either soften or liquefy as well as become adhesively active and allowing or causing the expansion component to expand in at least one direction causing contact of said matrix material and said associated pieces, thereby effecting a joining or bonding relationship upon cooling of said matrix component.

* * * * *